(12) United States Patent
Morrell

(10) Patent No.: US 11,086,686 B2
(45) Date of Patent: Aug. 10, 2021

(54) DYNAMIC LOGICAL PARTITION PROVISIONING

(71) Applicant: INTERNATIONAL BUSINESS MACHINES CORPORATION, Armonk, NY (US)

(72) Inventor: Timothy Morrell, Dutchess, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 141 days.

(21) Appl. No.: 16/145,863

(22) Filed: Sep. 28, 2018

(65) Prior Publication Data
US 2020/0104187 A1    Apr. 2, 2020

(51) Int. Cl.
*G06F 9/46* (2006.01)
*G06F 9/50* (2006.01)
*G06F 9/48* (2006.01)

(52) U.S. Cl.
CPC .......... *G06F 9/5077* (2013.01); *G06F 9/4856* (2013.01); *G06F 9/5016* (2013.01)

(58) Field of Classification Search
CPC ..... G06F 9/5077; G06F 9/4856; G06F 9/5016
See application file for complete search history.

(56) References Cited

U.S. PATENT DOCUMENTS

| | | | |
|---|---|---|---|
| 4,862,349 A * | 8/1989 | Foreman | G06F 9/46 718/1 |
| 5,506,975 A * | 4/1996 | Onodera | G06F 13/24 710/260 |
| 5,898,855 A * | 4/1999 | Onodera | G06F 9/4843 711/6 |
| 5,923,890 A * | 7/1999 | Kubala | G06F 9/5077 712/1 |
| 6,199,179 B1 * | 3/2001 | Kauffman | G06F 9/5077 714/11 |
| 6,226,734 B1 * | 5/2001 | Kleinsorge | G06F 9/5077 712/13 |
| 6,247,109 B1 * | 6/2001 | Kleinsorge | G06F 9/461 711/153 |
| 6,260,068 B1 * | 7/2001 | Zalewski | G06F 9/5077 707/999.01 |
| 6,356,367 B1 * | 3/2002 | DeCusatis | H04B 10/00 398/13 |
| 6,359,709 B1 * | 3/2002 | DeCusatis | H04B 10/00 398/13 |
| 6,359,713 B1 * | 3/2002 | DeCusatis | H04B 10/29 398/178 |
| 6,442,613 B1 * | 8/2002 | Gregg | H04L 47/10 709/217 |

(Continued)

*Primary Examiner* — Adam Lee
(74) *Attorney, Agent, or Firm* — Cantor Colburn LLP; Tedd Maranzano

(57) ABSTRACT

A technique relates to moving a target logical partition. A software application receives a trigger to automatically move the target logical partition from a first system to a second system. The logical partition memory of the target logical partition is transferred from the first system to a coupling facility. In response to completion of transferring the logical partition memory of the target logical partition to the coupling facility, the logical partition memory of the target logical partition is transferred from the coupling facility to the second system.

17 Claims, 4 Drawing Sheets

(56) References Cited

U.S. PATENT DOCUMENTS

| | | | | |
|---|---|---|---|---|
| 6,625,638 B1* | 9/2003 | Kubala | G06F 9/5077 | 711/173 |
| 6,704,766 B1* | 3/2004 | Goss | G06F 9/4843 | 709/226 |
| 6,990,545 B2 | 1/2006 | Arimilli et al. | | |
| 7,532,218 B1* | 5/2009 | Wagner | G06F 13/28 | 345/531 |
| 8,055,733 B2 | 11/2011 | Gimpl et al. | | |
| 8,140,816 B2 | 7/2012 | Hofer et al. | | |
| 8,458,714 B2 | 6/2013 | King et al. | | |
| 8,819,691 B2 | 8/2014 | Abdul et al. | | |
| 9,329,882 B2 | 5/2016 | Garza et al. | | |
| 9,329,907 B1* | 5/2016 | George | G06F 9/5083 | |
| 9,477,508 B1* | 10/2016 | Vemuri | G06F 3/067 | |
| 9,633,051 B1* | 4/2017 | Maccanti | G06F 11/1464 | |
| 10,372,490 B2* | 8/2019 | Ferris | G06F 9/5072 | |
| 2001/0025317 A1* | 9/2001 | Gregg | H04L 47/26 | 709/237 |
| 2001/0030943 A1* | 10/2001 | Gregg | H04L 47/10 | 370/231 |
| 2002/0129172 A1* | 9/2002 | Baskey | G06F 9/544 | 719/310 |
| 2003/0163651 A1* | 8/2003 | Jain | G06F 9/5016 | 711/147 |
| 2003/0167313 A1* | 9/2003 | Brown | G06F 9/445 | 709/215 |
| 2004/0030837 A1* | 2/2004 | Geiner | G06F 11/2064 | 711/133 |
| 2004/0098715 A1* | 5/2004 | Aghera | G06F 8/65 | 717/173 |
| 2005/0005200 A1* | 1/2005 | Matena | G06F 9/5072 | 714/38.13 |
| 2005/0091354 A1* | 4/2005 | Lowell | G06F 11/3051 | 709/223 |
| 2005/0278488 A1* | 12/2005 | Flemming | G06F 9/5077 | 711/153 |
| 2006/0080514 A1* | 4/2006 | Newport | G06F 9/544 | 711/153 |
| 2007/0061281 A1* | 3/2007 | Buttlar | G06F 11/362 | |
| 2007/0061618 A1* | 3/2007 | Helmich | G06F 9/524 | 714/11 |
| 2007/0083867 A1* | 4/2007 | Davies | G06F 9/524 | 718/104 |
| 2007/0140263 A1* | 6/2007 | Mitome | H04L 12/4645 | 370/395.53 |
| 2007/0150709 A1* | 6/2007 | Easton | G06F 11/0766 | 712/224 |
| 2007/0253328 A1* | 11/2007 | Harper | H04L 45/00 | 370/219 |
| 2008/0189701 A1* | 8/2008 | Hayakawa | G06F 9/5027 | 718/1 |
| 2008/0256501 A1* | 10/2008 | Armstrong | G06F 9/4856 | 716/125 |
| 2009/0043557 A1* | 2/2009 | Branda | G06F 9/45533 | 703/13 |
| 2009/0105999 A1* | 4/2009 | Gimpl | G06F 9/5077 | 703/6 |
| 2009/0141630 A1* | 6/2009 | Denzel | H04L 43/0882 | 370/235 |
| 2009/0164660 A1* | 6/2009 | Abrams | H04L 67/1095 | 709/236 |
| 2009/0182927 A1* | 7/2009 | Stevens | G06F 9/5077 | 711/1 |
| 2009/0204962 A1* | 8/2009 | Diaz | G06F 9/45533 | 718/1 |
| 2009/0222640 A1* | 9/2009 | Bauman | G06F 9/5077 | 711/173 |
| 2009/0249333 A1* | 10/2009 | Yamaguchi | G06F 9/5094 | 718/1 |
| 2009/0307456 A1* | 12/2009 | Patwari | G06F 12/08 | 711/173 |
| 2009/0307686 A1* | 12/2009 | Hepkin | G06F 9/45558 | 718/1 |
| 2010/0100892 A1* | 4/2010 | Fought | G06F 9/5077 | 719/328 |
| 2010/0161922 A1* | 6/2010 | Sharp | G06F 9/45558 | 711/162 |
| 2010/0205397 A1* | 8/2010 | Chellam | G06F 9/5077 | 711/173 |
| 2010/0229175 A1* | 9/2010 | Gonzalez, Jr. | G06F 9/5088 | 718/104 |
| 2011/0055711 A1* | 3/2011 | Jaquot | G11B 19/025 | 715/736 |
| 2011/0107332 A1* | 5/2011 | Bash | H05K 7/20836 | 718/1 |
| 2011/0153971 A1* | 6/2011 | O'Neill | G06F 9/5022 | 711/165 |
| 2012/0030686 A1* | 2/2012 | Mukherjee | G06F 9/5094 | 718/105 |
| 2012/0063458 A1* | 3/2012 | Klink | G06F 9/45558 | 370/392 |
| 2012/0069032 A1* | 3/2012 | Hansson | G06F 9/45558 | 345/522 |
| 2012/0102258 A1* | 4/2012 | Hepkin | G06F 9/45558 | 711/6 |
| 2012/0226866 A1* | 9/2012 | Bozek | G06F 9/4856 | 711/122 |
| 2013/0235519 A1* | 9/2013 | Miyauchi | G06F 9/45558 | 361/679.46 |
| 2013/0262915 A1* | 10/2013 | Frank | G06F 11/2023 | 714/4.11 |
| 2013/0332678 A1* | 12/2013 | Fitzpatrick | G06F 9/544 | 711/147 |
| 2014/0241144 A1* | 8/2014 | Kashyap | H04L 47/365 | 370/216 |
| 2015/0020068 A1* | 1/2015 | Garza | G06F 9/4856 | 718/1 |
| 2015/0040127 A1* | 2/2015 | Dippenaar | G06F 9/5044 | 718/1 |
| 2015/0040128 A1* | 2/2015 | Garza | G06F 9/5077 | 718/1 |
| 2015/0046589 A1* | 2/2015 | Garza | G06F 9/5016 | 709/226 |
| 2015/0081943 A1* | 3/2015 | Larson | G06F 9/45558 | 710/264 |
| 2015/0095608 A1* | 4/2015 | Dusanapudi | G06F 3/0608 | 711/173 |
| 2015/0127916 A1* | 5/2015 | Kani | G06F 3/0644 | 711/153 |
| 2015/0128221 A1* | 5/2015 | Cao | H04W 12/08 | 726/4 |
| 2015/0207752 A1* | 7/2015 | Birkestrand | G06F 9/5027 | 709/226 |
| 2015/0229583 A1* | 8/2015 | Ponsford | G06F 9/5077 | 709/226 |
| 2016/0004551 A1* | 1/2016 | Terayama | G06F 9/45558 | 718/1 |
| 2016/0196157 A1* | 7/2016 | Kodama | G06F 9/45558 | 718/1 |
| 2016/0210141 A1 | 7/2016 | Gunti et al. | | |
| 2016/0217027 A1* | 7/2016 | Chauvet | G06F 11/1662 | |
| 2016/0324037 A1* | 11/2016 | Dow | H05K 7/20836 | |
| 2017/0012825 A1* | 1/2017 | Chandolu | G06F 3/067 | |
| 2017/0116055 A1* | 4/2017 | Harran | G06F 9/546 | |
| 2017/0132050 A1* | 5/2017 | Mackerras | G06F 9/30189 | |
| 2017/0168737 A1* | 6/2017 | Kumar | G06F 12/109 | |
| 2017/0192772 A1* | 7/2017 | Islam | G06F 11/1433 | |
| 2017/0242743 A1* | 8/2017 | Miller | G06F 11/0778 | |
| 2018/0018098 A1* | 1/2018 | Burugula | G06F 3/0664 | |
| 2018/0032250 A1* | 2/2018 | Deshpande | G06F 3/061 | |
| 2018/0107521 A1* | 4/2018 | Benke | G06F 12/084 | |
| 2018/0129523 A1* | 5/2018 | Bryant | G06F 9/45558 | |
| 2018/0150310 A1* | 5/2018 | Muralidharan | G06F 13/105 | |
| 2018/0150331 A1* | 5/2018 | Chen | G06F 9/5077 | |
| 2018/0173456 A1* | 6/2018 | Jung | G11C 7/1042 | |
| 2018/0173536 A1* | 6/2018 | Sela | G06F 9/441 | |

(56) References Cited

U.S. PATENT DOCUMENTS

2019/0235901 A1\* 8/2019 Aiyar .................. G06F 9/45558
2019/0286475 A1\* 9/2019 Mani ..................... G06F 9/4856
2019/0364105 A1\* 11/2019 Lou ....................... G06F 3/0635

\* cited by examiner

FIG. 2 SYSPLEX 100

DYNAMIC LOGICAL PARTITION PROVISIONING

BACKGROUND

The present invention relates generally to computer systems, and more specifically, to dynamic logical partition (LPAR) provisioning.

A logical partition, commonly called an LPAR, is a subset of a computer's hardware resources, virtualized as a separate computer. In effect, a physical machine can be partitioned into multiple logical partitions, each hosting a separate operating system. Logical partitioning divides hardware resources. Two LPARs might access memory from a common memory chip, provided that the ranges of addresses directly accessible to each do not overlap. CPUs can be dedicated to a single LPAR or shared. On some mainframes, LPARs are managed by the PR/SM™ (Processor Resource/System Manager™) facility. In mainframe computing, a PR/SM is a type-1 hypervisor (a virtual machine monitor) that allows multiple logical partitions to share physical resources such as CPUs, I/O channels, and direct access storage devices (DASD). Multiple LPARs running z/OS® can form a Sysplex or Parallel Sysplex®, whether on one machine or spread across multiple machines.

SUMMARY

Embodiments of the present invention are directed to a computer-implemented method for moving a target logical partition. Non-limiting examples of the method include receiving, by a software application, a trigger to automatically move the target logical partition from a first system to a second system, and transferring logical partition memory of the target logical partition from the first system to a coupling facility. Also, the method includes in response to completion of transferring the logical partition memory of the target logical partition to the coupling facility, transferring the logical partition memory of the target logical partition from the coupling facility to the second system.

Embodiments of the present invention are directed to a computer system for moving a target logical partition. Non-limiting examples of the computer system include memory and a processor communicatively coupled to the memory, the processor configured to perform a method. The method includes receiving, by a software application executed by the processor, a trigger to automatically move the target logical partition from a first system to a second system, and transferring logical partition memory of the target logical partition from the first system to a coupling facility. Also, the method includes in response to completion of transferring the logical partition memory of the target logical partition to the coupling facility, transferring the logical partition memory of the target logical partition from the coupling facility to the second system.

Embodiments of the present invention are directed to a computer program product for moving a target logical partition. Non-limiting examples of the computer program product include a computer readable storage medium having program instructions embodied therewith, the program instructions readable by a processor to cause the processor to perform a method. The method includes receiving, by the processor, a trigger to automatically move the target logical partition from a first system to a second system, and transferring logical partition memory of the target logical partition from the first system to a coupling facility. Also, the method includes in response to completion of transferring the logical partition memory of the target logical partition to the coupling facility, transferring the logical partition memory of the target logical partition from the coupling facility to the second system

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
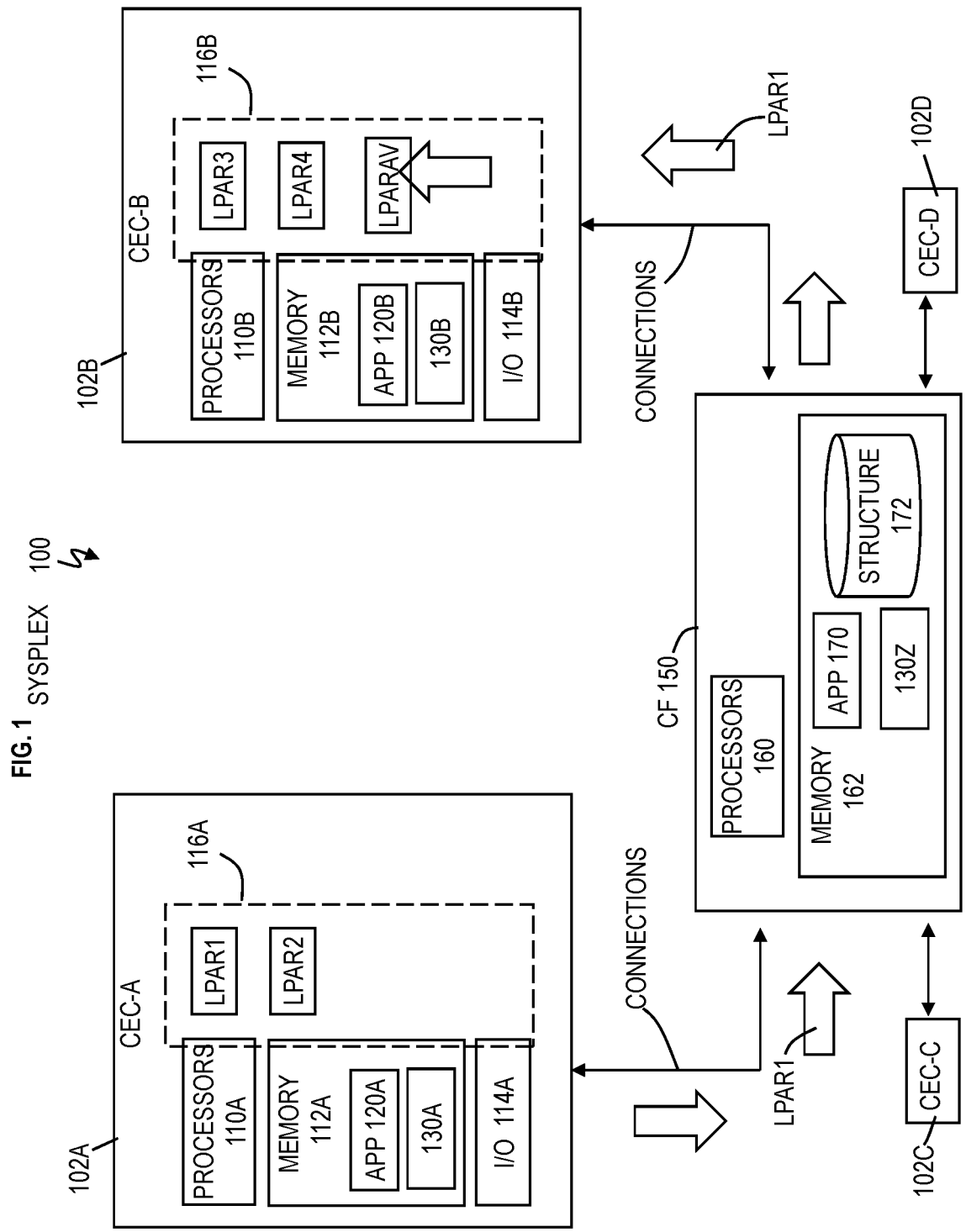
FIG. 1 depicts an example of dynamic LPAR provisioning using a sysplex according to embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the embodiments of the invention, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this document. It is noted that various connections and positional relationships (e.g., over, below, adjacent, etc.) are set forth between elements in the following description and in the drawings. These connections and/or positional relationships, unless specified otherwise, can be direct or indirect, and are not intended to be limiting in this respect. Accordingly, a coupling of entities can refer to either a direct or an indirect coupling, and a positional relationship between entities can be a direct or indirect positional relationship. As an example of an indirect positional relationship, references to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The descriptions of the various embodiments of the present invention have been presented for purposes of illustration, but are not intended to be exhaustive or limited to the embodiments discussed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments discussed herein.

The term "about" and variations thereof are intended to include the degree of error associated with measurement of the particular quantity based upon the equipment available at the time of filing the application. For example, "about" can include a range of ±8% or 5%, or 2% of a given value.

Turning now to an overview of technologies that are more specifically relevant to aspects of the invention, in System z® by IBM® and other systems, it is sometimes necessary to swap out or move an LPAR from one central electronics complex (CEC) to another CEC. In the world of cloud infrastructure, this would be a viable tool. In order to keep the cloud infrastructure current with changing processor hardware, there needs to be a way to automatically move (as opposed to manually move) the LPAR from old hardware to new hardware without disruption.

Turning now to an overview of the aspects of the invention, one or more embodiments of the invention provide an automated process to move an LPAR from one system to another system dynamically without disruption to work being done by that LPAR. This is dynamic LPAR provisioning performed automatically by a software application. The software application can automatically build the LPAR or work engine on new hardware and move the existing workload(s) from that running engine that is running production workload to new faster hardware, such as when new hardware is introduced into a data center. The process of dynamic LPAR provisioning is to mimic or copy the LPAR (or work engine) that is providing the necessary resources to run production workload to new hardware. In the state-of-the-art today, movement of an LPAR is done manually anytime new resources are introduced into a data center or in-house computing environment. According to embodiments of the invention, the dynamic LPAR provisioning process by the software application is to set up the new LPAR (engine) on the new or replacement hardware and then start the new LPAR (engine) without affecting the LPAR or engine it is to replace. Once new hardware such as System z® hardware is installed with proper connectivity into the existing infrastructure, software methods are used to copy what is to be moved or replaced into storage according to embodiments of the invention. The software application can create an avatar world of that environment designated as, for example, LPARAV, and then switch from avatar world (LPARAV) to real world (new LPAR which was previously designated as LPARAV) seamlessly allowing upgrades to happen without disruption to real world events or workloads.

Figure 2:
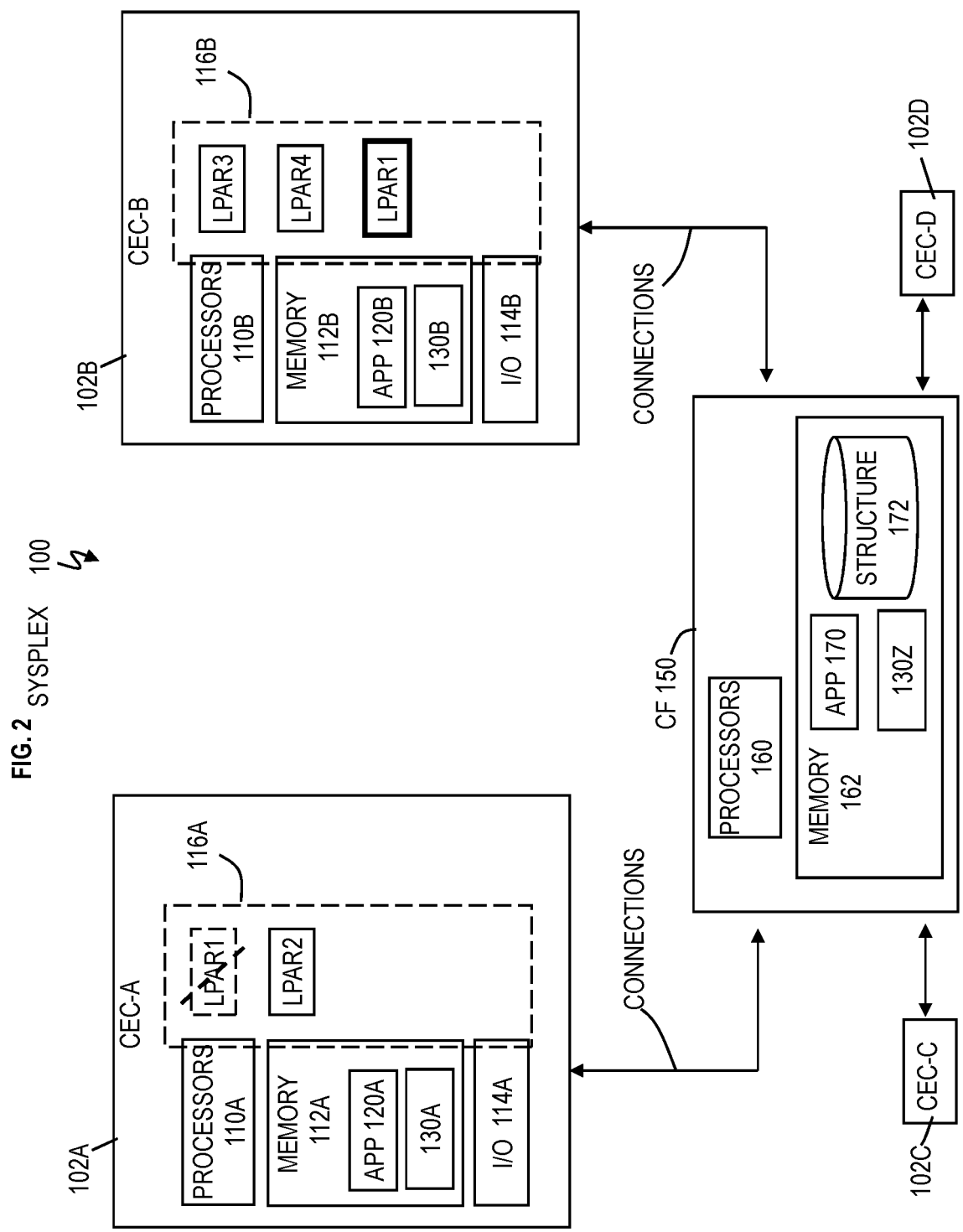
FIG. 2 continues the example of dynamic LPAR provisioning using the sysplex according to embodiments of the invention.

Turning now to a more detailed description of aspects of the present invention, FIGS. 1 and 2 depict an example of dynamic LPAR provisioning using a sysplex 100. A sysplex 100 is a collection of z/OS® systems that cooperate, using certain hardware and software products, to process work. It is a clustering technology that can provide near-continuous availability. The sysplex increases the number of processing units and z/OS® operating systems that can cooperate, which in turn increases the amount of work that can be processed.

The sysplex 100 can include numerous CECs, such as, for example, CEC-A 102A, CEC-B 102B, CEC-C 102C, CEC-D 102D, generally referred to as CECs 102. Central electronic complex (CEC) and central processor complex (CPC) can be used interchangeably, and refer to the physical collection of hardware that includes main storage, one or more central processors, timers, and channels as understood by one skilled in the art.

Example scenarios will be discussed using CEC-A 102A and CEC-B 102B for dynamic LPAR provisioning, although the discussion applies by analogy to any two of the CECs. The CEC-A 102A and CEC-B 102B respectively include processor 110A, 110B, memory devices 112A, 112B (including main memory and cache memory), and input/output (I/O) channels 114A, 114B. The CEC-A 102A can include numerous logical partitions 116A, such as LPAR1, LPAR2, etc. Similarly, the CEC-B 102B can include numerous logical partitions 116B, such as LPAR3, LPAR4, new LPARAV (which is created for the transfer of LPAR1 as discussed below), etc. The LPARs 116A and 116B run on and utilize the resources (such as processors, memory, I/O channels, etc.) on the respective CEC-A 102A and CEC-B 102B, and the resources of CEC-A 102A and CEC-B 102B are partitioned into the respective LPARs 116A and 116B as understood by one skilled in the art. Each CEC-A 102A and CEC-B 102B is respectively connected to a coupling facility (CF) 150. The CF 150 includes processors 160, memory device 162 (including main memory and cache memory). Also, CFs do not use I/O channels because CFs do not need access to external storage that CEC-A or CEC-B have access to. The only I/O CF's use is coupling facility links, internal and external links. Coupling facility links are internal if the CF resides on the same CEC as the LPARs in movement or external if the CF is on a CEC that does not have the in movement LPARS on it.

In mainframe computers, a coupling facility (CF) is a piece of computer hardware which allows multiple processors to access the same data. A parallel sysplex relies on one or more coupling facilities (CFs). A coupling facility can be a mainframe processor (e.g., it can run in an LPAR, with dedicated physical central processors units (CPUs) (coupling facility does not use channel paths, other than the special CF links mentioned), defined through hardware management console (HMC)), with memory and special channels (CF links), and a specialized operating system called coupling facility control code (CFCC).

In this example scenario, LPAR1 in partitions 116A of CEC-A 102A is to be moved to partitions 116B of CEC-B 102B via CF 150. The software application 120A in CEC-A, software application 120B in CEC-B, and/or software application 170 are each configured to move LPAR1 in CEC-A to CEC-B according to embodiments of the invention. In this example, software application 170 is utilized to direct and control the movement of LPAR1, although software application 120A and/or software application 120B can be utilized in conjunction with software application 170. Instructions can be passed between software applications 120A, 120B, 170 to facilitate movement of LPAR1 according to embodiments of the invention. In some implementations, the software applications 120A and 120B can be hypervisors and/or operating systems in CEC-A 102A and CEC-B 102B respectively. Also, the software applications 120A, 120B, 170 can use/incorporate operating systems such as z/OS® to control the hardware through IEASYM member and IODF. The IEASYM defines the system symbol and system parameters the sysplex will use. The IODF is the I/O definition file (IODF). The IODF contains information about the I/O configuration, such as: operating system data; switch data;

and device data, including EDT definition, processor data, partition data, channel path data, control unit data, channel subsystem data.

The software application 170 can automatically start the movement of LPAR1 from CEC-A 102A to CEC-B 102B in response to one or more predefined conditions in rules 130Z (and/or rules 130A, 130B) being met. Further regarding the rules 130Z (and/or rules 130A, 130B) is discussed herein. Additionally, the software application 170 can automatically start the movement of LPAR1 from CEC-A 102A to CEC-B 102B at the direction of an operator.

The coupling facility 150 is to have sufficient storage as a memory structure 172 in memory device 162 to meet the needs of the LPAR memory for LPAR1. The software application 170 is configured to check that the CF 150 has an LPAR memory structure (LMS) 172 large enough to contain the LPAR memory of LPAR1 before moving LPAR1. The available LPAR memory structure 172 has to be equal to or greater than the LPAR memory (e.g., data files) of LPAR1 of memory device 112A dedicated to LPAR1 in CEC-A 102A. If not, another coupling facility has to be used and/or the LPAR memory structure 172 has to be increased by allocating more memory space (i.e., more gigabytes) in memory device 162 to the LPAR memory structure 172, removing other data items from LPAR memory structure 172 not associated with moving LPAR1, etc.

After the software application 170 checks and confirms that the LPAR memory structure 172 is large enough to accommodate the LPAR memory of LPAR1 (currently used in memory device 112A), the software application 170 is configured to initiate LPAR1 movement. When LPAR1 movement is initiated by the software application 170, the software application 170 is configured to stop I/O activity (of I/O channels 114A) and CPU activity (of processors 110A) dedicated for LPAR1 for the period of time that it takes to complete movement of LPAR memory (e.g., data files) from LPAR1 in CEC-A to (memory structure 172 in) CF 150 and then to LPARAV in CEC-B. The software application 170 is configured to prepare a holding LPAR, designated LPARAV, in the receiving logical partition 116B of CEC-B 102B. For example, the software application 170 can allocate/partition the resources on CEC-B 102B needed for LPAR1, and the resources include allocations of processors 110B, memory device 112B, I/O channels 114B, etc. After stopping all I/O activity (of I/O channels 114A) and CPU activity (of processors 110A) dedicated to LPAR1 (only), the software application 170 is configured to transfer the LPAR memory of LPAR1 from CEC-A 102A to the coupling facility LMS memory structure 172 of CF 150.

When the transfer of the LPAR memory of LPAR1 to the LMS memory structure 172 is complete, the software application 170 is configured to transfer the previously transferred LPAR memory of LPAR1 to the new LPAR memory (in memory device 112B) of LPARAV in CEC-B 102B. When the transfer is complete, LPARAV becomes (i.e., is assigned the identifier of) the original LPAR1. Also, the software application 170 (e.g., by sending instructions to software application 120B) is configured to start I/O and CPU activity for new LPAR1 on CEC-B 102B, as shown in FIG. 2. LPAR1 has been removed from CEC-A 102A (as shown by the strikethrough) and moved to CEC-B 102B. It should be appreciated that the overall I/O and CPU activity for the CEC-A and CEC-B are not stopped for other LPARs but just the I/O and CPU activity dedicated to LPAR1. However, when transfer of LPAR memory of LPAR1 is complete, the only activity needed to resume is now on LPARAV which has become the (new) LPAR1 on CEC-B in the example scenario. The LPAR1 on CEC-A can now be deactivated and its resources reused elsewhere if needed.

As noted above, the rules 130Z (and/or rules 130A and 130B) contain conditions that automatically trigger the software application 170 (and/or software applications 120A and 120B) to automatically start the LPAR movement. The trigger can be an instruction that executes upon the condition being met. The rules 130Z can contain predefined conditions for both logical partitions 116A (e.g., LPAR1 and LPAR2) in CEC-A of 102A and logical partitions 116B (e.g., LPAR3 and LPAR4) in CEC-B of 102B, while rules 130A contain conditions for CEC-A and rules 130B contain conditions for CEC-B.

Again, using LPAR1 as an example, the rules 130Z can contain various predefined conditions which can be monitored by the software application 170 and/or the software application 120A. If monitored by the software application 120A, the software application 120A can send a start LPAR movement instruction (i.e., trigger) to the software application 170 in order to cause the software application 120A to start the LPAR movement of LPAR1. The start LPAR movement instruction identifies the LPAR, such as LPAR1, to be moved, and can optionally identify the new CEC, such as CEC-B, to receive the LPAR1. Also, the software application 170 can monitor the LPAR1 in order to determine when the predefined condition in rules 130Z is met, and meeting the condition executes an instruction to trigger the software application 170 to start LPAR movement for LPAR1.

Based on monitoring LPAR1 by software application 120A and/or software application 170, the following are examples of one or more conditions that can be met in rules 130Z (and/or rules 130A, 130B) to automatically trigger LPAR movement. The rules 130Z can include new/upgrade hardware conditions, such as when new hardware is installed in a CEC and/or a new CEC is connected to the CF 150. For example, the LPAR1 is identified in advance (e.g., in a table in rules 130A, 130Z) as being a candidate for LPAR movement from CEC-A 102A, and upon installation of new hardware in CEG-B 102B and/or installation of new CEC-B 102B to the CF 150, this is a trigger to move LPAR1 from CEC-A 102A to the CEC-B 102B having the new hardware. Another condition can be when faster processors 110B are installed in, for example, CEC-B 102B, as compared processors 110A in CEC-A 102A, and meeting this condition triggers software application 170 to start the LPAR movement. This can require the software application 170 to compare the processor speed (and/or type) of processors 110A (e.g., specifications of processors 110A listed in rules 130Z and/or in CEC-A 102A) to the processor speed (and/or type) of processors 110B (e.g., specifications of processors 110B listed in rules 130Z and/or in CEC-B 102B). Also, a condition can be when faster/larger memory device 112B is installed in, for example, CEC-B 102B, as compared memory device 112A in CEC-A 102A, and meeting this condition triggers software application 170 to start the LPAR movement. This can require the software application 170 to compare the memory speed (read/write speed and/or cache size) of memory device 112A (e.g., specifications of memory device 112A listed in rules 130Z and/or in CEC-A 102A) to the memory speed (read/write speed and/or cache size) of memory device 112B (e.g., specifications of memory device 112B listed in rules 130Z and/or in CEC-B 102B). Further, a condition can be when a higher quality cooling system is installed in, for example, CEC-B 102B, to trigger software application 170 to start the LPAR movement. This can require the software application 170 to compare the cooling system (e.g., indicating that cooling fans are utilized) for CEC-A 102A (e.g., specifications listed in rules 130Z and/or in CEC-A 102A) to the cooling system (e.g., specifications indicating that a dedicated air conditioning system is utilized in addition to cooling fans) for CEC-B 102B (e.g., specifications listed in rules 130Z and/or in CEC-B 102B). Because CEC-B 102B has a more advanced cooling system, the condition is met to trigger software application 170 to start the LPAR movement. Additionally, a condition can be when quantum processors are installed and/or come online for use in or with, for example, CEC-B 102B, to trigger software application 170 to start the LPAR movement to CEC-B 102B. This can require the software application 170 to recognize (parse the rules 130Z) that LPAR1 is a candidate for quantum processing, and upon the specifications listing (in rules 130Z and/or in CEC-B 102B) that CEC-B 102B includes quantum processors (e.g., one or more of processors 110B can be quantum processors), this can trigger the software application 170 to perform the LPAR movement of LPAR1. In one case, two or more new/upgrade hardware conditions are required to be meet cause the trigger.

Figure 3:
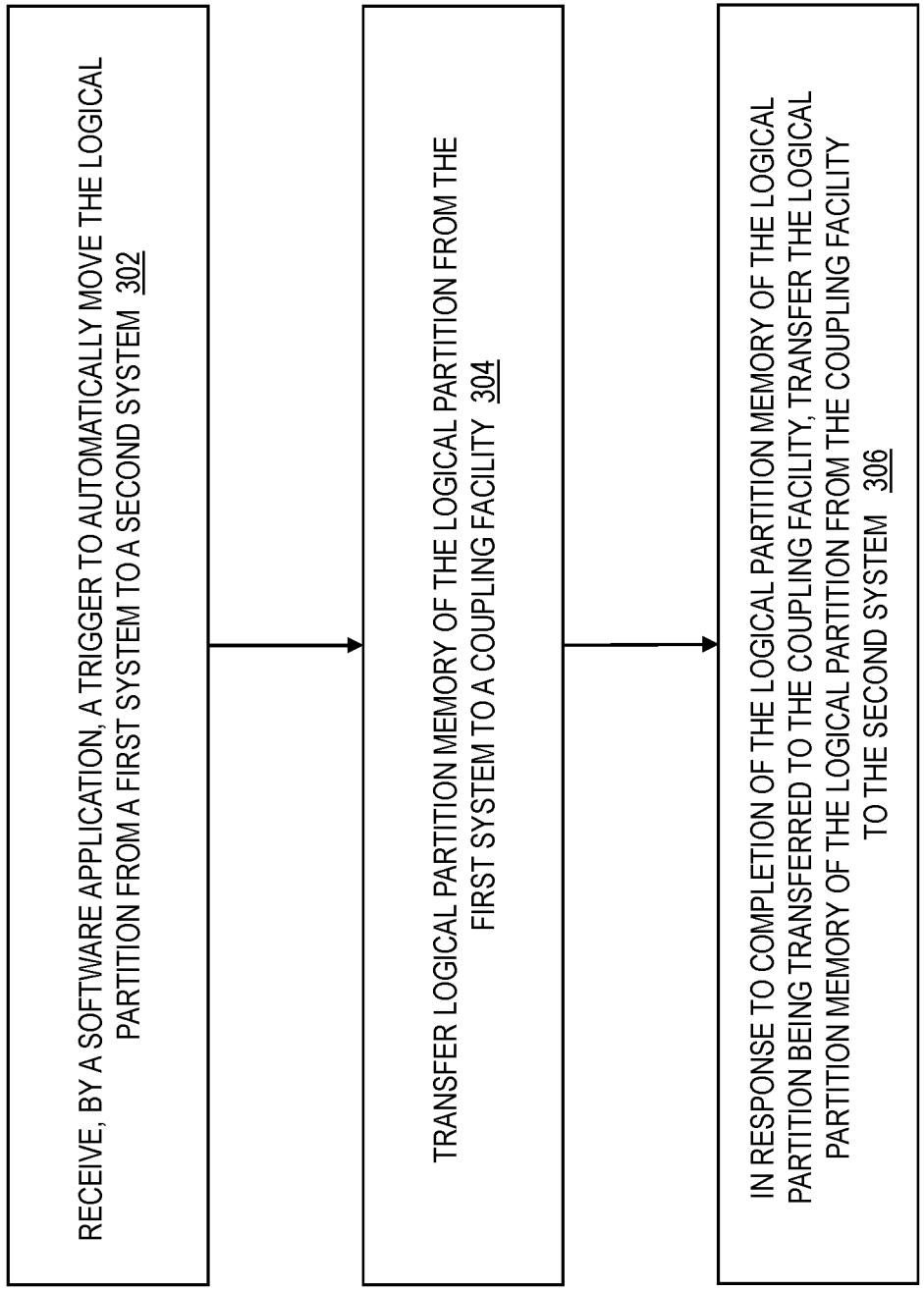
FIG. 3 depicts a flowchart of a method for dynamic LPAR provisioning according to embodiments of the invention.

According to embodiments of the invention, FIG. 3 is a flow chart 300 of an automated computer-implemented method for moving a (target) logical partition by the software application 170 which can work in conjunction with software applications 120A and 120B. At block 302, the software application 170 is configured to receive a trigger to automatically move the target logical partition (e.g., LPAR1) from a first (computer) system 102A to a second (computer) system 102B. The software application 170 can monitor rules 130A, 130B, and/or 130Z to determine that one or more conditions have been met, and as a result of meeting one or more conditions, the software application 170 is configured to automatically start the process of transferring target LPAR1 from the first system 102A to the second system 102B. Also, the software applications 120A, 120B can monitor rules 130A, 130B, and/or 130Z to determine that one or more conditions have been met, and as a result of meeting one or more conditions, the software applications 120A, 120B instruct the software application 170 automatically start the process of transferring target LPAR1 from the first system 102A to the second system 102B.

At block 304, the software application 170 is configured to transfer logical partition memory of the logical partition (e.g., target LPAR1) from the first (computer) system 102A to a coupling facility 150. For example, the software application 170 can copy data files (including all workloads, jobs, etc.) in memory device 112A associated with (target) LPAR1 and/or instructs software application 120A to copy the data files associated with (target) LPAR1. Then, the software application 170 transfers and/or causes the software application 120A to transfer all copied data files associated with (target) LPAR1 from memory device 112A to the memory structure 172 in memory device 162. Additionally, the copied data files of (target) LPAR1 can include memory associated general purpose registers, access registers, etc., which were defined as being designated to (target) LPAR1.

At block 306, the software application 170 is configured to, in response to completion of the logical partition memory (i.e., data files) of the logical partition being transferred to the coupling facility 150, transfer the logical partition memory (i.e., data files) of the logical partition from the coupling facility 150 to the second (computer) system 102B. For example, the software application 170 can transfer the data files to a prepared location such as LPARAV in the second system 102B, which has allocated memory of memory device 112B (along with other resources) prepared in advance by software application 120B.

The coupling facility 150 is connected to both the first system (e.g., CEC-A 102A) and the second system (e.g., CEC-B 102B). The coupling facility 150 includes (available) memory (in memory device 162) sufficient to accommodate the logical partition memory (e.g., the transferred data files) of the logical partition (e.g., (target) LPAR1). The coupling facility 150 includes one or more processors 160 and memory device 162.

The software application 170 is configured to cause a new logical partition (e.g., LPARAV) to be prepared in the second system 102B. For example, the software application 170 can instruct the software application 120B to create the LPARAV and/or the software application 170 can create the LPARAV. In response to the logical partition memory (e.g., data files) of the logical partition (e.g., LPAR1) being transferred to the second system (e.g., CEC-B 102B), the new logical partition (e.g., LPARAV) becomes (i.e., is assigned the identifier of) the logical partition (LPAR1 as seen in FIG. 2).

Preparing the new logical partition (e.g., LPARAV) in the second system (e.g., CEC-B 102B) includes allocating resources (e.g., processors 110B, memory device 112B, I/O channels 114B) of the second system (e.g., CEC-B 102B) to the new logical partition (e.g., LPARAV). The trigger is based on meeting one or more predefined conditions in rules 130A, 130B, 130Z.

Figure 4:
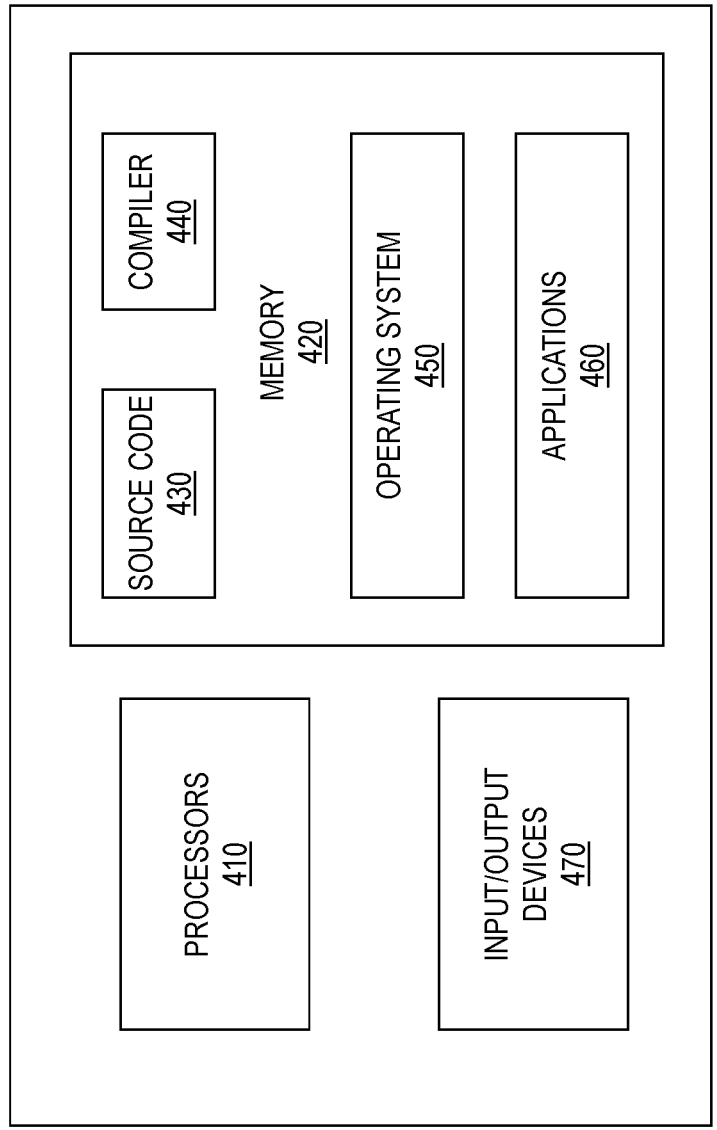
FIG. 4 depicts a computer system having features and components that can be utilized in and/or in conjunction with embodiments of the invention.

FIG. 4 illustrates an example of a computer system 400 which may be utilized in conjunction with dynamic LPAR movements as discussed herein according to embodiments of the invention. Various operations and features discussed above may utilize the capabilities of the computer 400. One or more of the capabilities of the computer 400 may be incorporated in any element, module, application, and/or component discussed herein for CEC-A 102A, CEC-B 102B, and/or coupling facility 150.

The computer 400 includes, but is not limited to, PCs, workstations, laptops, PDAs, palm devices, servers, storages, mainframes, and the like. Generally, in terms of hardware architecture, the computer 400 may include one or more processors 410, memory 420, and one or more I/O devices 470 that are communicatively coupled via a local interface (not shown). The local interface can be, for example, but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 410 is a hardware device for executing software that can be stored in the memory 420. The processor 410 can be virtually any custom made or commercially available processor, a central processing unit (CPU), a digital signal processor (DSP), or an auxiliary processor among several processors associated with the computer 400, and the processor 410 may be a semiconductor based microprocessor (in the form of a microchip) or a macroprocessor.

The memory 420 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 420 may incorporate electronic, magnetic, optical, and/or other types of storage media. Note that the memory 420 can have a distributed architecture, where various components are situated remote from one another but can be accessed by the processor 410.

The software in the memory 420 may include one or more separate programs, each of which comprises an ordered listing of executable instructions for implementing logical functions. The software in the memory 420 includes a suitable operating system (O/S) 450, compiler 440, source code 430, and one or more applications 460 in accordance with exemplary embodiments. As illustrated, the application 460 comprises numerous functional components for implementing the features and operations of the exemplary embodiments. The application 460 of the computer 400 may represent various applications, computational units, logic, functional units, processes, operations, virtual entities, and/or modules in accordance with exemplary embodiments, but the application 460 is not meant to be a limitation.

The operating system 450 controls the execution of other computer programs, and provides scheduling, input-output control, file and data management, memory management, and communication control and related services. It is contemplated by the inventors that the application 460 for implementing exemplary embodiments may be applicable on all commercially available operating systems.

Application 460 may be a source program, executable program (object code), script, or any other entity comprising a set of instructions to be performed. When a source program, then the program is usually translated via a compiler (such as the compiler 440), assembler, interpreter, or the like, which may or may not be included within the memory 420, so as to operate properly in connection with the O/S 450. Furthermore, the application 460 can be written as an object oriented programming language, which has classes of data and methods, or a procedure programming language, which has routines, subroutines, and/or functions, for example but not limited to, C, C++, C #, Pascal, BASIC, API calls, HTML, XHTML, XML, ASP scripts, FORTRAN, COBOL, Perl, Java, ADA, .NET, and the like.

The I/O devices 470 may include input devices such as, for example but not limited to, a mouse, keyboard, scanner, microphone, camera, etc. Furthermore, the I/O devices 470 may also include output devices, for example but not limited to storage devices, printers, display, etc. Finally, the I/O devices 470 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 470 also include components for communicating over various networks, such as the Internet or intranet.

If the computer 400 is a PC, workstation, intelligent device or the like, the software in the memory 420 may further include a basic input output system (BIOS) (omitted for simplicity). The BIOS is a set of essential software routines that initialize and test hardware at startup, start the O/S 450, and support the transfer of data among the hardware devices. The BIOS is stored in some type of read-only-memory, such as ROM, PROM, EPROM, EEPROM or the like, so that the BIOS can be executed when the computer 400 is activated.

When the computer 400 is in operation, the processor 410 is configured to execute software stored within the memory 420, to communicate data to and from the memory 420, and to generally control operations of the computer 400 pursuant to the software. The application 460 and the O/S 450 are read, in whole or in part, by the processor 410, perhaps buffered within the processor 410, and then executed.

When the application 460 is implemented in software it should be noted that the application 460 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 460 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any means that can store the program for use by or in connection with the instruction execution system, apparatus, or device. The computer readable storage medium can be, for example but not limited to, an electronic, magnetic, optical, electromagnetic, or semiconductor system, apparatus, or a device.

More specific examples (a nonexhaustive list) of the computer-readable storage medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable storage medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 460 is implemented in hardware, the application 460 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    determining, by a software application executed by a processor of a coupling facility, that a condition is met, meeting the condition triggering a transfer of a copy of a logical partition memory in a first system to the coupling facility, the copy of the logical partition memory being a copy of a memory of a first logical partition in the first system, the coupling facility being an intermediary and separate from the first and second system for transferring the copy of the logical partition memory from the first system and to the second system, the condition being the completion of one or more upgrades to processors at the second system;
    responsive to the condition being met, transferring, by the software application of the coupling facility, the copy of the logical partition memory from the first system to the coupling facility; and in response to completion of transferring the copy of the logical partition memory to the coupling facility, transferring, by the software application of the coupling facility, the copy of the logical partition memory from the coupling facility to the second system, the second system having resources prepared in advance of transferring the copy of the logical partition memory, from the coupling facility to the second system, the resources including at least the upgraded processors.

2. The computer-implemented method of claim 1, further comprising:
Checking, by the software application, that the coupling facility comprises memory space sufficient to accommodate the copy of the logical partition memory; and
in response to the coupling facility having insufficient memory space, allocating more memory space in the coupling facility to accommodate the copy of the logical partition memory.

3. The computer-implemented method of claim 1, wherein the coupling facility comprises a memory, input/output channels, and multiple processors.

4. The computer-implemented method of claim 1, wherein the software application is configured to cause a new logical partition to be prepared in the second system.

5. The computer-implemented method of claim 4, wherein in response to the copy of the logical partition memory being transferred to the second system, the new logical partition is assigned an identifier.

6. The computer-implemented method of claim 4, wherein preparing the new logical partition in the second system comprises allocating at least some of the resources of the second system to the new logical partition.

7. The computer-implemented method of claim 1, wherein rules are stored in the coupling facility.

8. A computer system comprising:
memory and a processor communicatively coupled to the memory, the processor configured to perform a method comprising:
determining, by a software application executed by the processor of a coupling facility, that a condition is met, meeting the condition to triggering a transfer of a copy of a logical partition memory in a first system to the coupling facility, the copy of the logical partition memory being a copy of a memory of a first logical partition in the first system, the coupling facility being an intermediary and separate from the first and second systems for transferring the copy of the logical partition memory from the first system and to the second system, the condition being the completion of one or more upgrades to processors at the second system;
responsive to the condition being met, transferring, by the software application of the coupling facility, the copy of the logical partition memory from the first system to the coupling facility; and
in response to completion of transferring the copy of the logical partition memory to the coupling facility, transferring, by the software application of the coupling facility, the copy of the logical partition memory from the coupling facility to the second system, the second system having resources prepared in advance of transferring the copy of the logical partition memory from the coupling facility to the second system, the resources including at least the upgraded processors.

9. The computer system of claim 8, wherein the coupling facility comprises memory space sufficient to accommodate the copy of the logical partition memory.

10. The computer system of claim 8, wherein the coupling facility comprises a memory, input/output channels, and multiple processors.

11. The computer system of claim 8, wherein the software application is configured to cause a new logical partition to be prepared in the second system.

12. The computer system of claim 11, wherein in response to the copy of the logical partition memory being transferred to the second system, the new logical partition is assigned an identifier.

13. The computer system of claim 11, wherein preparing the new logical partition in the second system comprises allocating at least some of the resources of the second system to the new logical partition.

14. The computer system of claim 8, wherein rules are stored in the coupling facility.

15. A computer program product comprising:
a computer readable storage medium having program instructions embodied therewith, the program instructions readable by a processor to cause the processor to perform a method comprising:
determining, by the processor of a coupling facility, that a condition is met, meeting the condition triggering a transfer of a copy of a logical partition memory in a first system to a second system the coupling facility, the copy of the logical partition memory being a copy of a memory of a first logical partition in the first system, the coupling facility being an intermediary and separate from the first and second systems for transferring the copy of the logical partition memory from the first system and to the second system, the condition being the completion of one or more upgrades to processors at the second system;
responsive to the condition being met, transferring, by the processor of the coupling facility, the copy of the logical partition memory from the first system to a coupling facility; and
in response to completion of transferring the copy of the logical partition memory to the coupling facility, transferring, by the processor of the coupling facility, the copy of the logical partition memory from the coupling facility to the second system, the second system having resources prepared in advance of transferring the copy of the logical partition memory from the coupling facility to the second system the resources including at least the upgraded processors.

16. The computer program product of claim 15, wherein the coupling facility comprises memory space sufficient to accommodate the copy of the logical partition memory.

17. The computer program product of claim 15, wherein the coupling facility comprises a memory, input/output channels, and multiple processors.

* * * * *